Oct. 15, 1963  H. SAUER  3,107,269
RANGE FINDER DEVICE FOR PHOTOGRAPHIC CAMERAS
Filed May 23, 1962  4 Sheets-Sheet 1
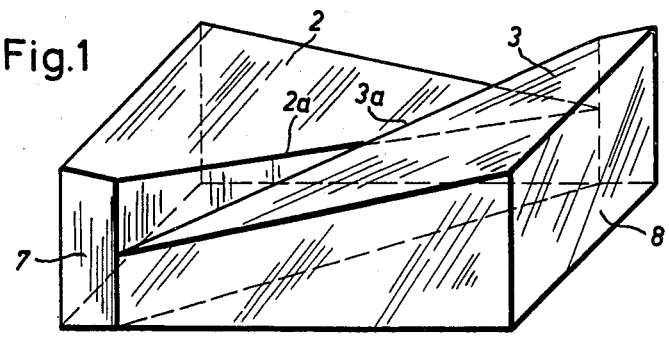
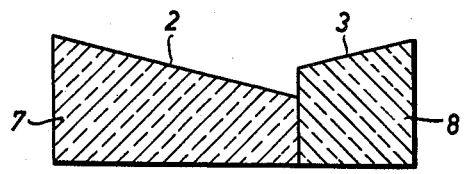
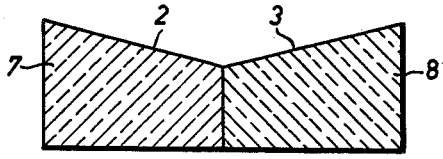
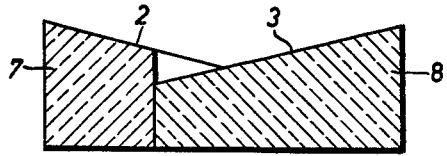
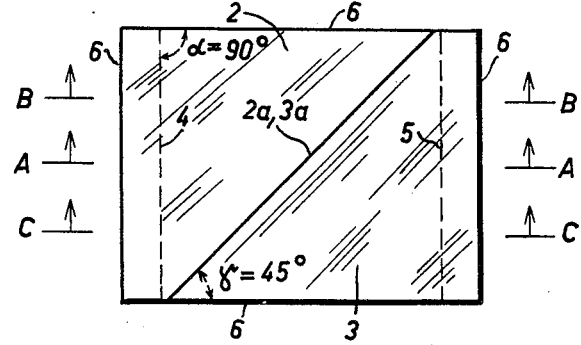
INVENTOR:
Hans Sauer
BY Singer, Stern & Carlberg,
Attorneys.

Oct. 15, 1963 H. SAUER 3,107,269
RANGE FINDER DEVICE FOR PHOTOGRAPHIC CAMERAS
Filed May 23, 1962 4 Sheets-Sheet 2
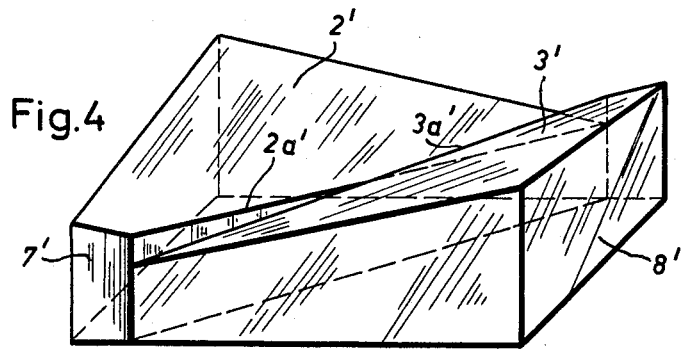
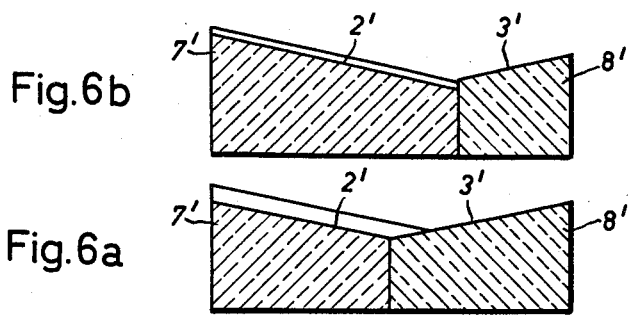
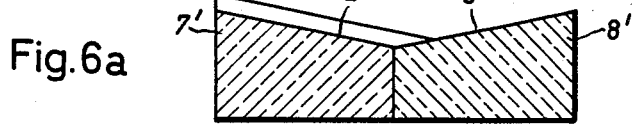
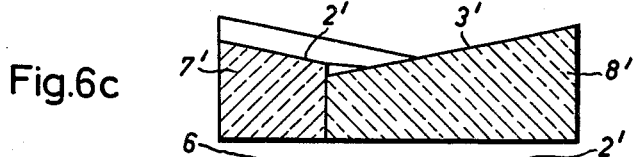
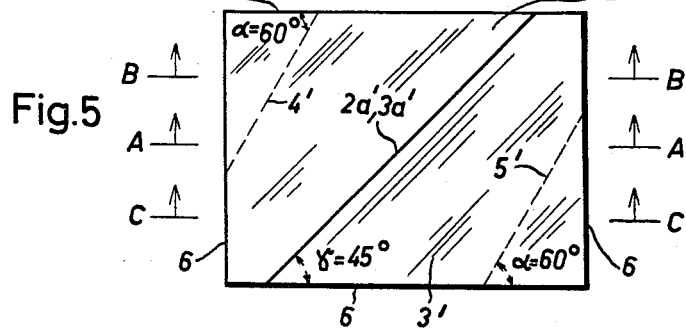

Oct. 15, 1963     H. SAUER     3,107,269
RANGE FINDER DEVICE FOR PHOTOGRAPHIC CAMERAS
Filed May 23, 1962     4 Sheets-Sheet 3
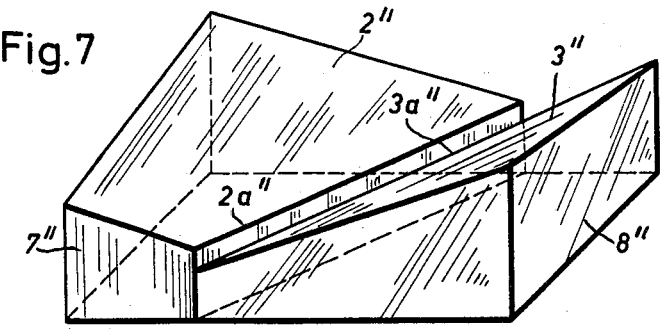
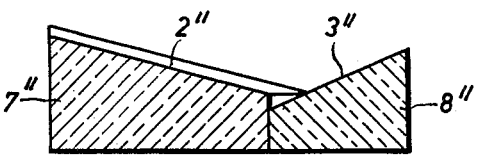
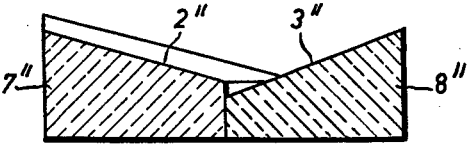
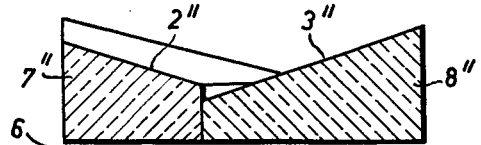
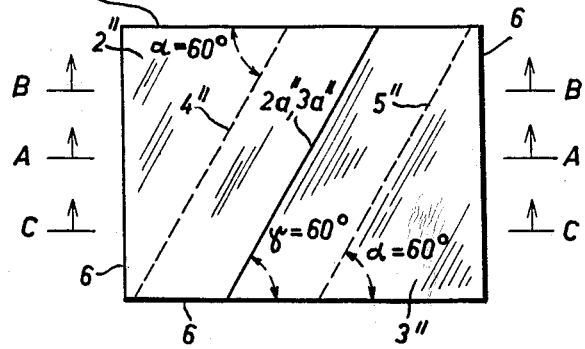
INVENTOR:
Hans Sauer,
BY Singer, Stern & Carlberg
Attorneys.

Oct. 15, 1963   H. SAUER   3,107,269
RANGE FINDER DEVICE FOR PHOTOGRAPHIC CAMERAS
Filed May 23, 1962   4 Sheets-Sheet 4

INVENTOR:
Hans Sauer,
BY Singer, Stern & Carlburg
Attorneys.

United States Patent Office 3,107,269
Patented Oct. 15, 1963

3,107,269
RANGE FINDER DEVICE FOR PHOTOGRAPHIC CAMERAS
Hans Sauer, Heidenheim (Brenz), Germany, assignor to Carl Zeiss-Stiftung, doing business as Carl Zeiss, Wurttemberg, Germany, a corporation of Germany
Filed May 23, 1962, Ser. No. 197,109
Claims priority, application Germany June 9, 1961
6 Claims. (Cl. 88—1.5)

This invention relates to a photographic camera provided with an objective which is combined with a range finder device in which a portion of the incoming light is deflected from the light path of the photographic objective into a double wedge sharpness indicator which is arranged in a real image plane of the view finder light path. The invention relates in particular to the construction of the double wedge sharpness indicator employed for sharp focusing according to the split image principle.

It is an object of the invention to provide range finder devices, which are particularly used in small film cameras equipped with a pancratic objective, with a double wedge sharpness indicator consisting of two wedges which divide the entire viewing area into two equal portions. These two wedges face each other with their thin sides and abut along a straight line area in such a manner that the two wedge portions are of different thickness along the abutting faces.

In order to be able to utilize for a measurement the object edges, which in nature run mostly vertically or horizontally, another object of the invention provides for the abutting faces to extend inclined to the long sides of the view finder field and to form with them an angle which lies within the range of $35°<\gamma<60°$ or $120°<\gamma<145°$.

In accordance with another object of the invention the inclination of the wedge faces toward the abutting faces may vary in such a manner that the refracting edges and the long sides of the view finder area form an angle $\alpha$ within the range of $40°<\gamma<140°$.

Another object of the invention is to arrange such a double wedge sharpness indicator in the view finder light path, preferably in such a manner that the common plane base surface of the two wedge sections is positioned vertically to the optical axis in the view finder light path, while the two inclined top surfaces are directed toward the ocular.

A further object of the invention is to connect such a sharpness indicator consisting of two wedge sections with a plano-convex field lens which may simultaneously serve as carrier for the indicator.

In the following the invention will now be described in more detail with reference to the accompanying drawings, in which:

FIG. 1 is a perspective view of the first embodiment of the wedge indicator according to the invention;

FIG. 2 is a top view of the indicator illustrated in FIG. 1;

FIG. 3a is a sectional view along the line A—A of FIG. 2;

FIG. 3b is a sectional view along the line B—B of FIG. 2;

FIG. 3c is a sectional view along the line C—C of FIG. 2;

FIG. 4 is a perspective view of a second embodiment of the indicator according to the invention;

FIG. 5 is a top view of the indicator illustrated in FIG. 4;

FIG. 6a is a sectional view along the line A—A of FIG. 5;

FIG. 6b is a sectional view along the line B—B of FIG. 5;

FIG. 6c is a sectional view along the line C—C of FIG. 5;

FIG. 7 is a perspective view of a third embodiment of the indicator according to the invention;

FIG. 8 is a top view of the indicator illustrated in FIG. 7;

FIG. 9a is a sectional view along the line A—A of FIG. 8;

FIG. 9b is a sectional view along the line B—B of FIG. 8;

FIG. 9c is a sectional view along the line C—C of FIG. 8;

Figure 10:
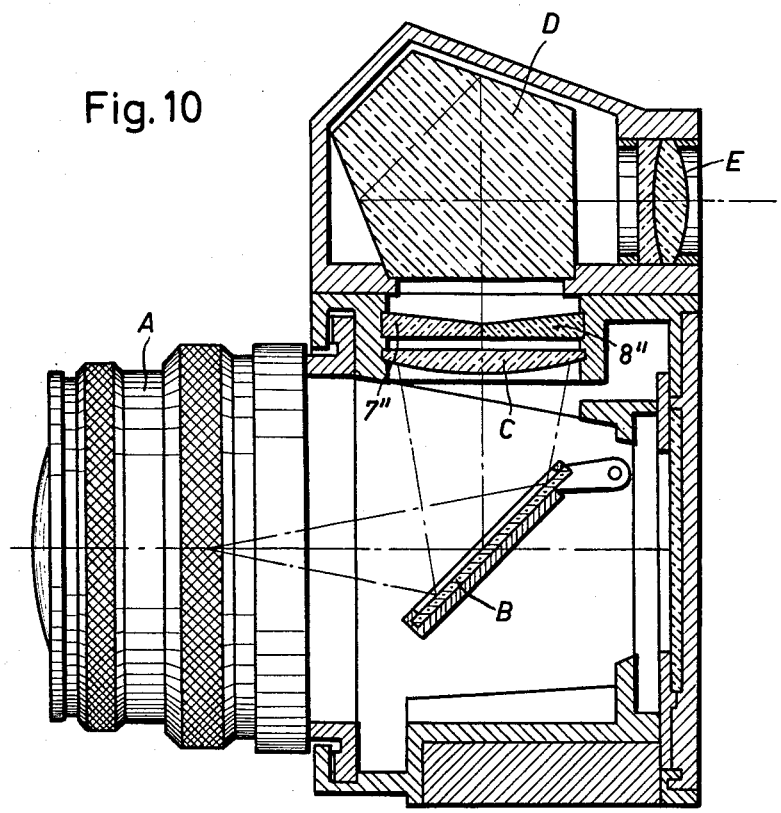
FIG. 10 is a side elevation view and a partial vertical sectional view of a single lens mirror reflex camera equipped with a range finder and a view finder device of the invention.

Referring to the FIGS. 1–3, the wedge indicator consists of two wedge portions 7 and 8. The base surfaces of these wedge portions are directed outwardly so that the thickness of the wedges progressively increases toward the outer edges. The abutting faces $2a$ and $3a$ at the inner ends of the upper faces 2 and 3 of the wedge extend as a srtaight surface at an angle of $\gamma=45°$, and the refracting edges of the wedges are positioned at an angle of $90°$ with respect to the long side of the view finder area. The direction of the refracting edges is indicated in FIG. 2 by the dash lines 4 and 5 extending perpendicular to the long sides of the rectangular viewfinder area. The two wedge portions 7 and 8 may be manufactured individually which makes it possible to fashion the edges, which are visible between the wedge surfaces and the surfaces that abut the wedge portions, particularly accurate and clean. The two wedge portions may be cemented to one another or they may be held together by mechanical means.

FIG. 2 illustrates the indicator of FIG. 1 in a top view and shows that the view finder area which is defined by a rectangular frame 6 contains no structure other than the rectilinear abutting faces $2a$ and $3a$ positioned at an angle of $45°$.

A second embodiment of the wedge indicator according to the present invention is illustrated in FIG. 4 in which the wedges $7'$ and $8'$ have abutting faces $2a'$ and $3a'$ and the long sides of the view finder area also from an angle of $\gamma=45°$ while, however, unlike FIG. 1, the refracting edges are positioned at an angle of $\gamma=60°$. In this case the direction of the refracting edges is indicated in FIG. 5 by the two spaced parallel dash lines $4'$ and $5'$.

FIG. 5 illustrates the sharpness indicator of FIG. 4 in a top view and shows that within the finder frame 6 no structure other than the rectilinear abutting faces $2a'$ and $3a'$ is visible.

A third modification of the wedge indicator according to the invention is illustrated in FIG. 7. This embodiment differs from the indicators illustrated in the FIGS. 1 and 4 in that the thickness of the wedge portions $7''$ and $8''$ along the abutting faces $2a''$ and $3a''$ is of the same sign. This embodiment has the advantage that only in one of the two wedge portions the edge forming the abutting face between the wedge surface, for instance $2''$ or $3''$, and the surface at which the two wedge portions $7''$ and $8''$ abut, has to be made especially sharp and precise.

FIG. 8 shows the indicator illustrated in FIG. 7 from the top. The abutting faces $2a''$ and $3a''$ extend at an angle of $\gamma=60°$ with respect to the long sides of the view finder frame 6 and the refracting edges of the two wedge portions $7''$ and $8''$ indicated by the dash lines $4''$ and $5''$ are inclined to the long sides of the view finder area at an angle of $\alpha=60°$. The two wedge portions $7''$ and 8″ thereby effect a light ray deflection in a direction perpendicular to the abutting faces 2a″ and 3a″.

FIG. 10 illustrates by way of example in what manner the double wedge indicator 7‴, 8‴ is arranged in the view finder of a single lens mirror reflex camera provided with a camera objective A, a tiltable reflecting mirror B, a plano-convex field lens C, a roof top reflecting prism D and an ocular E.

Figure 11:
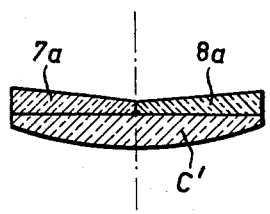
FIG. 11 is a sectional view of the sharpness indicator of the invention when cemented to a plano-convex field lens.

In FIG. 11 is shown that the double wedge indicator 7a, 8a may be cemented to the upper plane face of the plano-convex field lens C′.

In contrast to the known wedge arrangements which are employed in a real image plane in the view finder light path in order to permit a distance measurement in accordance with the so-called split image principle, the sharpness indicators of the invention have the advantage that any disturbance of the observation of the view finder image by the distance measuring means is held to a minimum. In the view finder there is visible only a single, diagonally extending fine and sharp dividing line. This line is formed by the abutting face between the two wedge portions. The edge angle is substantially 90° which is favorable in the manufacture of these parts in order to make the edge sufficiently sharp and so accurate that it is satisfactory even in a magnification of 15 times or more.

By a proper determination of the size of the angle $\gamma$ formed by the abutting faces and the long sides of the view finder area and by a selection of the proper size of the angle $\alpha$ formed by the refracting edges of the wedges and the long sides of the view finder area it is also possible to provide a size of the thickness difference at the border between the two wedge surfaces which is favorable in manufacture on one hand, while on the other hand, however, this thickness difference will not become so great that it would cause disturbingly large differences in the light paths.

Of particular advantage is the inventive sharpness indicator in mirror reflex range finder devices which are connected with a pancratic objective. In pancratic objectives a part of the light is deflected from the ray path by a beam splitter which is arranged in the ray path at a point where the entrance and the exit intercept length is relatively large. The construction elements of the finder following this beam splitter thus form a terrestrial telescope. For the construction of the objective it is advantageous that the beam splitter be of the smallest possible thickness in axial direction. By means of the double wedge indicator according to the present invention two partial pupils are now superimposed in a common exit pupil the size of which, viewed from the position of the beam splitter, is dependent upon the size of the exit pupil of the finder telescope and the telescopic enlargement brought about by the finder elements following the beam splitter. The mutual distance of these two partial pupils is dependent upon the size of the wedge deflection and their position of the direction of the wedge deflection, i.e. from the angle $\alpha$. If the deflection is effected by a mirror arranged parallel to the long sides of the view finder area, the connection line between the two partial pupils, viewed in the mirror, extends also parallel to the long sides of the view finder area is $\alpha=90°$, i.e. if the wedge deflection takes place in a direction parallel to the long sides of the view finder area. It is then possible to arrange the mirror, which is preferably positioned at an angle of 45° to the optical axis of the objective path, in a square division block the thickness of which in axial direction shows the minimum value in which this thickness is only dependent upon the size of the partial pupils. The advantage of a minimal axial thickness of the square division block is, however, offset by the limitation that in the same manner as in the known double wedge indicators a distance measurement can only be made along picture edges which extend vertically or inclined to the long sides of the view finder area. If it is desired to make a measurement also along the shorter vertical picture edges, the wedge surfaces in accordance with the invention may then be arranged in such a manner that the direction of the wedge deflection, which is dependent upon the position of the refracting edges, i.e. upon the angle $\alpha$, extends inclined to the long sides of the view finder area. In a square division block whose mirror surface is arranged parallel to the long sides of the view finder area, the thickness consequently has to be increased in axial direction about an amount proportional to $|\cos \alpha|$.

Since in small film cameras it is generally desired that the viewing through the ocular be selectively changed from a vertical position to a horizontal position with respect to the optical axis of the objective light path, it may be expedient to combine a double wedge indicator according to the invention, in which the wedge edges and the long sides of the view finder area form an angle $\alpha$ having a size other than 90°, with a beam splitter whose mirror surface is shifted from the described position about the optical axis of the photographic objective so that the reflection plane defined by the inciding beam and the reflected beam forms together with the long sides of the view finder area an angle of $(90+\alpha)$ or $(90-\alpha)$. In order to keep the thickness difference sufficiently small, the angle of inclination $\gamma$ in the case of $\alpha=90°$ is preferably so selected that $(\alpha-\gamma)=45°$.

What I claim is:

1. In a photographic camera, the combination with a photographic objective of a combined view finder having a rectangular viewing area and range finder device arranged to receive a portion of the light rays passing through said objective, said range finder comprising a double wedge sharpness indicator consisting of two wedges each of which covers one half of said rectangular view finder area, the thin portions of said wedges abutting each other along a common plane extending in a straight line across said entire view finder area, said two thin portions having different thicknesses along their abutting faces.

2. In a photographic camera, the combination with a photographic objective of a combined view finder having a rectangular viewing area and range finder device arranged to receive a portion of the light rays passing through said objective, said range finder comprising a double wedge sharpness indicator consisting of two wedges each of which covers one half of said rectangular view finder area, the thin portions of said wedges abutting each other along a common plane extending in a straight line across said entire view finder area, said two thin portions having different thicknesses along their abutting faces, said common plane extending inclined with respect to the longer sides of said view finder area and forming with said longer sides an angle $\gamma$ which lies within the range of 35° to 60°.

3. In a photographic camera, the combination with a photographic objective of a combined view finder having a rectangular viewing area and range finder device arranged to receive a portion of the light rays passing through said objective, said range finder comprising a double wedge sharpness indicator consisting of two wedges each of which covers one half of said rectangular view finder area, the thin portions of said wedges abutting each other along a common plane extending in a straight line across said entire view finder area, said two thin portions having different thicknesses along their abutting faces, said common plane extending inclinded with respect to the longer sides of said view finder area and forming with said longer sides an angle $\gamma$ which lies within the range of 120° to 145°.

4. In a photographic camera, the combination with a photographic objective of a combined view finder having a rectangular viewing area and range finder device arranged to receive a portion of the light rays passing through said objective, said range finder comprising a double wedge sharpness indicator consisting of two wedges each of which covers one half of said rectangular view finder area, the thin portions of said wedges abutting each other along a common plane extending in a straight line across said entire view finder area, said two thin portions having different thicknesses along their abutting faces, the inclination of the wedge faces toward said common plane being variable in such a manner that the refracting edges of the wedges form with the longer sides of the rectangular view finder area an angle $\alpha$ which lies within the range of 40° to 140°.

5. In a photographic camera, the combination with a photographic objective of a combined view finder having a rectangular viewing area and range finder device arranged to receive a portion of the light rays passing through said objective, said range finder comprising a double wedge sharpness indicator consisting of two wedges each of which covers one half of said rectangular view finder area, the thin portions of said wedges abutting each other along a common plane extending in a straight line across said entire view finder area, said two thin portions having different thicknesses along their abutting faces, said double wedge sharpness indicator being mounted within the path of the view finder light rays in such a manner that the plane base surfaces of said two wedges extend perpendicularly to the optical axis of said view finder light rays and that both inclined top faces of said wedges are directed toward the ocular of said view finder.

6. In a photographic camera, the combination with a photographic objective of a combined view finder having a rectangular viewing area and range finder device arranged to receive a portion of the light rays passing through said objective, said range finder comprising a double wedge sharpness indicator consisting of two wedges each of which covers one half of said rectangular view finder area, the thin portions of said wedges abutting each other along a common plane extending in a straight line across said entire view finder area, said two thin portions having different thicknesses along their abutting faces, said two wedges being provided with plane base surfaces arranged in a common plane, and a plano-convex field lens forming a part of said view finder, said two wedges being cemented with their plane base surfaces to the plane surface of said field lens.

References Cited in the file of this patent

UNITED STATES PATENTS 2,669,916     Dodin _____ Feb. 23, 1954